(12) United States Patent  (10) Patent No.: US 6,684,647 B2
Petrenko  (45) Date of Patent: *Feb. 3, 2004

(54) HIGH-FREQUENCY MELTING OF ICE BETWEEN FREEZER PACKAGES

(75) Inventor: Victor F. Petrenko, Lebanon, NH (US)

(73) Assignee: The Trustees of Dartmouth College, Hanover, NH (US)

( * ) Notice: Subject to any disclaimer, the term of this patent is extended or adjusted under 35 U.S.C. 154(b) by 77 days.

This patent is subject to a terminal disclaimer.

(21) Appl. No.: 10/141,018

(22) Filed: May 8, 2002

(65) Prior Publication Data

US 2002/0152762 A1 Oct. 24, 2002

Related U.S. Application Data

(63) Continuation-in-part of application No. 09/976,210, filed on Oct. 11, 2001, and a continuation-in-part of application No. 09/971,287, filed on Oct. 4, 2001, and a continuation-in-part of application No. 09/970,555, filed on Oct. 4, 2001, and a continuation-in-part of application No. 09/872,295, filed on Jun. 1, 2001, and a continuation-in-part of application No. 09/426,685, filed on Oct. 25, 1999, which is a division of application No. 09/094,779, filed on Jun. 15, 1998, now Pat. No. 6,027,075, application No. 10/141,018, which is a continuation-in-part of application No. PCT/US00/05665, filed on Mar. 1, 2000, which is a continuation-in-part of application No. PCT/US99/28330, filed on Nov. 30, 1999, application No. 10/141,018, which is a continuation-in-part of application No. PCT/US99/25124, filed on Oct. 26, 1999

(60) Provisional application No. 60/299,693, filed on Jun. 20, 2001, provisional application No. 60/262,775, filed on Jan. 19, 2001, provisional application No. 60/283,670, filed on Apr. 12, 2001, provisional application No. 60/122,463, filed on Mar. 1, 1999, provisional application No. 60/131,082, filed on Apr. 26, 1999, provisional application No. 60/110,440, filed on Dec. 1, 1998, and provisional application No. 60/105,782, filed on Oct. 27, 1998.

(51) Int. Cl.⁷ .................. F25D 21/06; F25D 21/00
(52) U.S. Cl. .............................. 62/80; 62/276
(58) Field of Search ...................... 62/80, 276

(56) References Cited

U.S. PATENT DOCUMENTS

| | | | | | |
|---|---|---|---|---|---|
| 3,915,883 | A | * | 10/1975 | VanMeter et al. | 252/299 |
| 3,971,056 | A | * | 7/1976 | Jaskolski et al. | 357/28 |
| 4,690,353 | A | * | 9/1987 | Haslim et al. | 244/134 |
| 4,950,950 | A | * | 8/1990 | Perry et al. | 313/504 |
| 5,112,449 | A | | 5/1992 | Jozefowicz et al. | |
| 5,218,472 | A | * | 6/1993 | Jozefowicz et al. | 359/584 |
| 5,744,704 | A | * | 4/1998 | Hu et al. | 73/105 |
| 5,873,254 | A | | 2/1999 | Arav | |
| 6,027,075 | A | * | 2/2000 | Petrenko | 244/134 |
| 6,239,601 | B1 | * | 5/2001 | Weinstein | 324/662 |
| 6,427,946 | B1 | * | 8/2002 | Petrenko | 244/134 |

* cited by examiner

*Primary Examiner*—William C. Doerrler
*Assistant Examiner*—Mark S. Shulman
(74) *Attorney, Agent, or Firm*—Curtis A. Vock; Lathrop & Gage L.C.

(57) ABSTRACT

An alternating electric field at an ice interface generates conductivity AC with a frequency greater than 1000 Hz in interfacial ice. Typically, a first electrode and a second electrode define an interelectrode space containing a stack of freezer packages. Each freezer package has an outer dielectric film and a continuous inner conductive layer coating the inside of the dielectric film. An AC power source provides a voltage of about 10 to 500 volts across the electrodes. The first and last freezer packages in the stack are proximate to the first and second electrodes, respectively. The AC voltage generates conductivity AC in the inner conductive layers. An alternating electric field between adjacent conductive layers generates conductivity current in the ice, resulting in Joule heat, which melts the ice.

28 Claims, 5 Drawing Sheets

HIGH-FREQUENCY MELTING OF ICE BETWEEN FREEZER PACKAGES

RELATED APPLICATIONS

This application claims the benefit of: U.S. provisional application Serial No. 60/299,693, filed Jun. 20, 2001; and is a continuation of PCT application PCT/US02/01858, entitled Ice Modification, Removal and Prevention, filed Jan. 22, 2002, which claims the benefit of U.S. provisional application Serial No. 60/262,775, filed Jan. 19, 2001; and U.S. provisional application Serial No. 60/283,670 filed Apr. 12, 2001. This application is also a continuation-in-part application of commonly-owned and copending U.S. patent application Ser. No. 09/976,210, filed Oct. 11, 2001. This application is also a continuation-in-part application of commonly-owned and copending U.S. patent application Ser. No. 09/970,555, filed Oct. 4, 2001. This application is also a continuation-in-part application of commonly-owned and copending U.S. patent application Ser. No. 09/872,295, filed Jun. 1, 2001. This application is also a continuation-in-part application of commonly-owned and copending U.S. patent application Ser. No. 09/971,287, filed Oct. 4, 2001. This application is also a continuation-in-part application of commonly-owned and copending U.S. patent application Ser. No. 09/426,685, filed Oct. 25, 1999, which is a divisional application of U.S. patent application Ser. No. 09/094,779, filed Jun. 15, 1998, issued as U.S. Pat. No. 6,027,075 on Feb. 22, 2000. This application is also a continuation-in-part application of commonly-owned and copending PCT application PCT/US00/05665, filed Mar. 1, 2000, which claimed the benefit of U.S. provisional application Serial No. 60/122,463, filed Mar. 1, 1999, now abandoned, and provisional application Serial No. 60/131,082, filed Apr. 26, 1999, now abandoned, and which is a continuation-in-part application of commonly-owned and copending PCT application PCT/US99/28330, filed Nov. 30, 1999, which claims the benefit of U.S. provisional application Serial No. 60/110, 440, filed Dec. 1, 1998, now abandoned, the benefit of U.S. provisional application Serial No. 60/122,463 filed Mar. 1, 1999, now abandoned, and the benefit of U.S. provisional application Serial No. 60/131,082 filed Apr. 26, 1999, now abandoned. This application is also a continuation-in-part application of commonly-owned and copending PCT application PCT/US99/25124, filed Oct. 26, 1999, which claims the benefit of U.S. provisional application Serial No. 60/105, 782, filed Oct. 27, 1998, now abandoned. Each of the applications and the patent named above are hereby incorporated by reference.

GOVERNMENT LICENSE RIGHTS

The U.S. Government has certain rights in this invention as provided for by the terms of Grant No. DAAH 04-95-1-0189, awarded by the Army Research Office, and of Grant No. MSS-9302792, awarded by the National Science Foundation.

FIELD OF THE INVENTION

The invention is related to the field of ice adhesion, specifically, to melting ice between freezer packages.

BACKGROUND OF THE INVENTION

Statement of the Problem

Ice adhesion to freezer packages causes various types of problems. Food, medical and biological materials, and other materials often are stored below the freezing temperature of water. The material is typically stored in freezer bags and various other types of freezer packages. Water vapor that condenses in a freezer and water from other sources freezes between the packages. As a result, adjacent packages are stuck together by ice adhering to adjacent outside surfaces of packages. Individual packages frozen to one or more other packages cannot be moved individually unless the ice is melted. Melting the ice to separate the packages raises the temperature of the material contained in the packages. This often results in undesired thawing of food, or otherwise raising the temperature of a package's contents above an undesired or a critical temperature. Therefore, the package's contents may be destroyed or rendered useless. Melting all of the ice between a large number of packages in a freezer by raising the freezer temperature causes downtime and an accumulation of liquid water, which must be removed from the freezer separately.

SUMMARY OF THE INVENTION

The invention helps to solve some of the problems mentioned above by providing systems and methods for melting ice at an ice interface and for preventing the formation of ice.

In one aspect of the invention, a system for both preventing ice and for melting ice on a freezer package includes a first electrode and a second electrode, the first electrode and the second electrode defining an interelectrode space for accommodating a freezer package. In another aspect, a system in accordance with the invention includes an AC power source for providing an AC voltage across the first and second electrodes. Typically, the AC voltage is a high-frequency voltage, with a frequency not less than about 1000 Hz. Preferably, the AC voltage has a frequency in a range of about from 10 kHz to 30 kHz. In still another aspect of the invention, the AC voltage does not significantly heat the contents of the freezer package or melt bulk ice. Typically, the AC voltage has an amplitude in a range of about from 10 to 1000 volts, but the voltage is 10 kV or higher in certain conditions.

In one aspect, a system further includes a freezer package located in the interelectrode space. In another aspect, the freezer package has a freezer package wall with an outer dielectric film and a continuous inner conductive layer contiguous to the outer dielectric film. In still another aspect, a freezer package wall has a first portion proximate to the first electrode so that the AC voltage generates an alternating electric field between the first electrode and the first portion strong enough to melt ice.

In another aspect, heating of the contents of a freezer package is insignificant, amounting generally to less than 1 calorie per gram, and typically less than 1/10 calorie per gram.

In another aspect of the invention, a system further includes a plurality of freezer packages arranged in a stack with a first freezer package proximate to the first electrode, and a last freezer package proximate to the second electrode, each of the plurality of freezer packages including an outer dielectric film and a continuous inner conductive layer contiguous to the outer dielectric film. A freezer package in accordance with the invention is useful for holding a variety of types of contents; for example, food and biological materials.

In another aspect, the invention further includes a freezer with a housing, and a first electrode and a second electrode that define an interelectrode space. Preferably, the first electrode is movable. In another aspect, a freezer system includes an AC power source for providing an AC voltage across the first and second electrodes with a frequency not less than about 1000 Hz, which AC voltage does not heat the contents of a freezer package. In one aspect, the second electrode is integral with the freezer housing. In another aspect, the second electrode is mounted in a freezer space of a conventional freezer or it is a movable electrode. In another aspect, a freezer system in accordance with the invention further includes a freezer package located in the interelectrode space. The freezer package has a freezer package wall with an outer dielectric film and a continuous inner conductive layer contiguous to the outer dielectric film. In another aspect, the freezer package wall has a first portion proximate to the first electrode so that the AC voltage generates an alternating electric field between the first electrode and the first portion strong enough to melt ice. In still another aspect, a freezer system further includes a plurality of freezer packages arranged in a stack with a first freezer package proximate to the first electrode, and a last freezer package proximate to the second electrode, each of the plurality of freezer packages including an outer dielectric film and a continuous inner conductive layer contiguous to the outer dielectric film.

In one aspect of the invention, a system for melting ice includes a first electrode and a second electrode, the first electrode and the second electrode defining an interelectrode space between the first electrode and the second electrode. The system may include a conductive layer located in the interelectrode space and electrically insulated from the first and second electrodes. In another aspect, a conductive layer is located proximate to the first or second electrode. In another aspect, a system includes an outer dielectric film that electrically insulates the conductive layer from the first and second electrodes and from ice and liquid water.

The invention also provides a method for preventing ice and for melting ice. A method in accordance with the invention includes a step of generating a high-frequency alternating electric field that prevents the formation of ice or melts interfacial ice without significantly heating bulk ice, bulk dielectric material, or contents of a freezer package. The step of generating a high-frequency alternating electric field may include applying an AC voltage with a frequency not less than about 1000 Hz across a first electrode and a second electrode. Typically, the AC voltage has an amplitude in a range of about from 10 to 1000 volts, but the voltage is 10 kV or higher in certain conditions. Typically, a method in accordance with the invention is used to prevent ice or melt ice on and between one or more freezer packages or other objects, the bulk of which is dielectric. Preferably, the objects, such as freezer packages, are located in an interelectrode space between the first electrode and the second electrode. In another aspect, the step of generating a high-frequency alternating electric field in the ice includes generating conductivity AC in an inner conductive layer, the inner conductive layer electrically insulated from the ice and the first and second electrodes. In other aspects, the inner conductive layer is contiguous to an outer dielectric film, and the outer dielectric film is located proximate to the first electrode and between the first electrode and the inner conductive layer.

BRIEF DESCRIPTION OF THE DRAWINGS

A more complete understanding of the invention may be obtained by reference to the drawings, in which.

DESCRIPTION OF THE INVENTION

The invention is described herein with reference to FIGS. 1–9. It should be understood that the structures and systems depicted in schematic form in FIGS. 3–9 are used to explain the invention and are not precise depictions of actual structures and systems in accordance with the invention. Furthermore, the embodiments described herein are exemplary and are not intended to limit the scope of the invention, which is defined in the claims below.

Embodiments are described herein mainly with reference to freezer packages. It is understood, however, that embodiments in accordance with the invention are useful for melting ice in other, different applications.

A capacitor does not provide strong resistance to high-frequency currents. At high frequency, the capacitor has a low impedance. A capacitor subjected to high-frequency voltage acts virtually as a direct electrical connection between electrical conductors. Thus, a capacitor provides efficient indirect connection of a high-frequency voltage source to an electrical conductor.

In accordance with one embodiment of the invention, dielectric layers such as thin dielectric polymer films are subjected to high-frequency voltage and function as thin film capacitors, providing efficient indirect electrical connection between successive conductive layers at high-frequency voltage. The potential difference between adjacent conductive layers creates a high-frequency alternating electric field between the layers. A portion of the electrostatic energy of the alternating electric field generates conductivity (resistive) AC in semiconductive interfacial ice located in the high-frequency alternating electric field between the conductive layers. The conductivity (resistive) AC in the interfacial ice causes Joule heat, which melts interfacial ice. The Joule heating power is:

$$W_h = \rho_{if} j^2 \qquad (1)$$

where $W_h$ is the heating power per m$^3$, $\sigma_{if}$ is interfacial ice electric resistivity, and j is the current density. Substitution of values for the resistivity of water and bulk ice into equation (1) yields an expression for the heating power in liquid water and in bulk ice, respectively.

Current density is proportional to alternating electric field strength, which can be expressed by the equation $$E = V/d \quad (2)$$

where E represents alternating electric field strength, V represents average potential difference, and d represents the distance between conductors having potential difference V. For a given value of resistivity, $\rho_{if}$, and for a given potential difference, V, the heating power, $W_h$, is inversely proportional to $d^2$. Thus, an increase in the value of d by a factor of 10, reduces the electric field strength and $W_h$ by a factor of approximately 100.

Combining Equations (1) and (2) yields:

$$W_h = \rho_{if} \cdot \left( \frac{1}{\rho_{if}} \cdot \frac{V^2}{d} \right) = \sigma_{if} \cdot \frac{V^2}{d^2} \quad (3)$$

in which $\sigma_{if}$ is interfacial ice conductivity, $\rho_{if}$ is interfacial ice resistivity, and $\sigma_{if} = 1/\rho_{if}$. There is virtually no potential difference between different parts of a particular food package because of the high conductivity of the conductive layer of the food package. Thus, the term "V" in Equation 3 represents the potential difference between two conductive layers of two adjacent packages in close proximity to each other. The distance "d" in smallest at the contact point or other regions of close proximity of two packages. In accordance with Equation (3), most of the heat is generated in such regions where the distance, d, is minimal. Typically, ice and frost "bridges" form in such regions of minimal "d". Thus, in accordance with the invention, heat is generated mainly where it is most useful.

A method and a system in accordance with the invention also prevent formation of ice, particularly in a freezer. As water vapor cools and condenses on a surface, a thin layer of liquid water is formed on the surface. The conductivity of liquid water is one to two orders of magnitude greater than the conductivity of interfacial ice, and it is about three to four orders of magnitude greater than the conductivity of bulk ice. As a result, an alternating electric field in accordance with the invention generates conductivity AC in the liquid water, causing Joule heat. The Joule heating of the liquid water layer causes the water to evaporate from the surface, thereby preventing the formation of ice.

The electrical conductivity of ice increases as the frequency of the alternating electric field increases. As conductivity, $\sigma_{if}$, increases, the heating power, $W_h$, also increases, in accordance with Equation (3). At high frequency (e.g., 10–30 kHz), interfacial ice is about 1000 times more conductive than at low frequency (50–200 Hz). As a result, for given field strength, V/d, the amount of heating power generated at high frequency is greater than at low frequency. Deicing in accordance with the invention occurs at AC frequencies as low as about 100 Hz; however, such low frequencies require high voltage. Therefore, the frequency of the alternating electric field and the AC voltage usually exceeds 1 kHz, and is preferably 10 kHz or greater. While other considerations may limit practically the frequency, from a heating standpoint, the frequency should be as high as possible. With high-frequency AC, that is, not less than about 1000 Hz (1 kHz), an AC voltage in a range of about from 2 volts to 10 volts per layer of ice is usually sufficient to melt ice in accordance with the invention.

An advantage of a system and a method in accordance with the invention, as compared to conventional heaters, is that the heating power, $W_h$, is generated directly where it is needed; that is, in the ice between freezer packages. Power is practically not applied to the bulk ice or to the contents of the packages. Also, virtually no power sinks into the environment. This reduces total energy consumption. Another advantage is that the contents of the freezer packages are not heated. As a result, undesired thawing of food or heating of heat-sensitive contents of freezer packages is avoided.

In typical embodiments in accordance with the invention, a thin dielectric polymer film separates an electrode at a given voltage from a conductive layer in a freezer package adjacent to the electrode. Typically, a conductive layer in a freezer package is a continuous metallized coating. Typically, a conductive layer is part of a laminate structure of a freezer package. For example, a typical freezer package used in accordance with the invention includes a wall with an outer, dielectric polymer film and an inner, metallized conductive layer. Preferably, a freezer package wall also includes an inner, dielectric polymer film, which serves to protect the inner conductive layer against physical injury.

An electrode in accordance with the invention typically has a form of a metal electrode plate or a flexible electrode pad. Preferably, there is not much air space between an electrode and the first freezer package (or last freezer package) in a stack of freezer packages because air acts as a relatively strong electrical insulator, thereby increasing voltage requirements. The outer dielectric film of each freezer package functions as a thin capacitor subjected to high-frequency voltage, thereby providing efficient indirect connection between adjacent electrical conductors; for example, between an electrode and the inner conductive layer of a freezer package, or between the inner conductive layers of adjacent freezer packages. The conductive layer of each freezer package in a stack of freezer packages between two electrodes conducts AC, but typically at a potential that is between the voltages at the two electrodes. A system and a method in accordance with the invention is also useful for preventing ice and melting ice on a single freezer package or a plurality of freezer packages in the interelectrode space between two electrodes. Co-owned and co-pending U.S. application Ser. No. 09/976,210, filed Oct. 11, 2001, which is incorporated herein by reference, teaches generally a system and a method for melting interfacial ice in a high-frequency alternating electric field.

Prevention of ice and melting of ice on a freezer package and between freezer packages in accordance with the invention is generally conducted using audio frequencies measured in kHz, for example, in a range of about from 10 to 30 kHz, and even up to several hundred kHz. In contrast, a conventional microwave oven operates with radio frequencies measured in MHz, generally greater than 100 MHz. Generating radio frequencies is much more difficult and expensive than generating audio frequencies.

A conventional microwave oven functions as a resonant cavity. A sufficiently strong electromagnetic field is achieved in a microwave oven only in the absence of conductive materials in the open chamber. If conductive parts are present in a microwave oven, the quality of the chamber degrades, there is no resonance, and therefore, no sufficiently strong electromagnetic field. In contrast, an apparatus and a method in accordance with the invention do not rely on resonance; rather, the strength of an electric field depends principally upon potential difference between inner conductive layers of adjacent freezer packages (or between an inner conductive layer and an electrode) and the interconductor distance.

Containers used in microwave ovens do not contain a conductive layer because a conductive layer would interfere with resonance in a microwave oven. In contrast, the metallized coatings or other conductive layers of freezer packages in accordance with the invention are substantially continuous. "Substantially continuous" means that a conductive layer surrounds the contents of a freezer package and all of the various portions of the conductive layer are electrically connected. As a result, the potential is the same in all portions of the conductive layer, and there is virtually no alternating electric field present within the enclosed volume or contents of the freezer package. Since there is virtually no alternating electric field in the contents of the freezer package, virtually no dielectric loss heating or Joule heating of the contents occurs. Practically, a substantially continuous conductive layer of a freezer package typically completely covers the inside surface of an outer dielectric film of a freezer package wall. Nevertheless, a conductive layer containing distinct conductive portions that are electrically connected may also be a substantially continuous conductive layer in accordance with the invention.

The term "conductive layer" and similar terms in the specification are used in two ways. First, they refer to a layer, coating or other structure of a freezer package with a conductivity in a range typical of a conductive metal or metal oxide, and which provides a continuous conductance path around a freezer package, and which is electrically insulated from the outside surface and the exterior of a freezer package. The thickness of metallized coatings in accordance with the invention is not critical. A coating may be relatively thin; for example, about 5 nm. Or it may be relatively thick; for example, 200 μm. An inner conductive coating typically covers substantially all of the surface area of the inside of a freezer package wall; nevertheless, it need not cover all of the surface area as long as it provides a conductance path connecting substantially all portions of a freezer package wall. Used in a second, broader sense, the term "conductive layer" refers to both an inner conductive layer of a freezer package or an electrode.

Numerous factors affect the Joule heating power delivered at an ice-solid contact interface. These include, among others: ice purity (affecting conductivity); AC voltage; AC frequency; interconductor distance; area of ice adjacent to opposing conductive layers; temperature. The small interconductor distance typically has a value in a range of about from 50 μm to 10 mm, preferably not exceeding 2.0 mm.

Melting of ice at the contact interface is usually sufficient for loosening a frozen stack of freezer packages and releasing the individual packages for easy movement because the surfaces of a package no longer adhere to the bulk ice between freezer packages. Conversely, the bulk ice no longer adheres to the packages, and if desired, the bulk ice can be easily removed in the frozen state, rather than in a liquid state. An advantage of a system and a method in accordance with the invention is that heating power is used principally to melt interfacial ice. To melt the interfacial ice at an ice-solid interface in accordance with the invention, substantially none of the bulk ice, freezer package contents, ambient freezer space or solid structures of a freezer housing need be heated above 0° C., the melting point of ice. This significantly reduces heat transfer into the environment, compared with conventional ice-heating methods in which a heating element is heated to a temperature above the melting point. Very little power is consumed to melt interfacial ice in accordance with the invention. As a result, total energy consumption is minimized in accordance with the invention.

A method in accordance with the invention is useful for melting ice at virtually any ice interface because electrical conductivity of interfacial ice is higher than the conductivity of bulk ice. Even within ice itself, electrical conductivity is higher along grain boundaries of polycrystalline ice because impurities in the ice tend to concentrate at grain boundaries. At an interface between ice and a non-ice material, electrical conductivity of interfacial ice is higher than that of bulk ice because non-ice material attracts conductive ions in ice to the interface. In ice located between freezer packages, the thin layer of ice in contact with and adjacent to the outside surface of a freezer package wall is interfacial ice. The ice covering a freezer package and having a contact interface with air is also interfacial ice. Melting of interfacial ice at the two ice-package contact interfaces between adjacent freezer packages in a stack of freezer packages serves to release individual freezer packages. In this specification, therefore, the term "interfacial ice" generally refers to the ice at the ice-package contact interface of a freezer package.

An alternating electric field in accordance with the invention may be produced using a variety of structures and techniques. For example, commonly-owned co-pending international patent application PCT/US00/05665, filed Mar. 1, 2000, discloses a system in which an alternating electric field is generated by flowing high-frequency AC through an electrical conductor proximate to ice being melted. This specification generally contemplates generating an alternating electric field by providing a high-frequency AC voltage across a first electrode and a second electrode that are electrically insulated from each other. Thus, the invention preferably utilizes a strong alternating electric field in the interfacial ice. The stronger the potential difference between the electrodes, the stronger the alternating electric field. The term "electrically insulated" and similar terms have their general meaning that there is no electrical shorting of electrically conductive elements. Accordingly, the terms also mean that there is no closed conductor path connecting a plurality of conductive elements to form a closed circuit. The electrical insulation helps to maintain the potential difference between conductive elements in accordance with the invention. It also prevents generation and dissipation of heat except in the interfacial ice.

Figure 1:
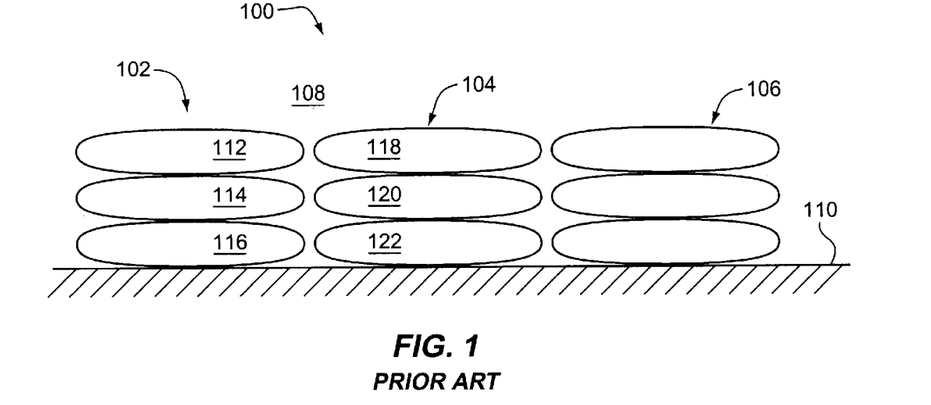
FIG. 1 depicts in schematic form a section of a conventional freezer with three stacks of freezer packages in its freezer space.
Figure 2:
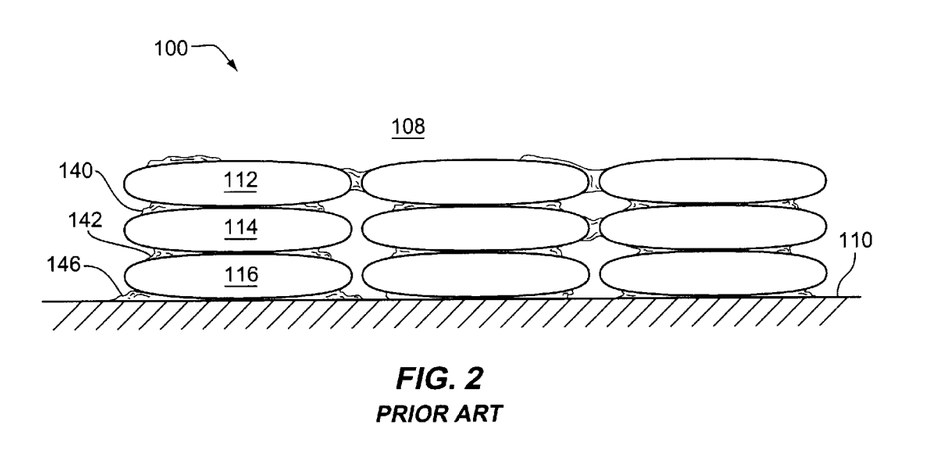
FIG. 2 shows the section of FIG. 1 at a later time at which ice has formed on and between the freezer packages.

In FIG. 1 is depicted in schematic form a section 100 of a conventional freezer with a freezer bottom 110, including three stacks 102, 104 and 106 of freezer packages in the freezer space 108 of the freezer. Stack 102 includes freezer packages 112, 114 and 116. Stack 104 includes freezer packages 118, 120 and 122. As depicted in FIG. 1, there is no significant amount of ice on or between the freezer packages. FIG. 2 shows section 100 at a later time at which ice has formed on and between the freezer packages. Typically, ice forms from condensation of water vapor in air as the air cools in a freezer. As depicted in FIG. 2, ice 140 is located between freezer package 112 and freezer package 114. Ice 142 is present between freezer package 114 and freezer package 116. In addition, ice 146 has formed between freezer package 116 and freezer bottom 110. Ice is also present on and between other freezer packages located in freezer space 108. Ice 140, 142, 146 makes packages stick together and stick to freezer bottom 110, making access to or movement of the freezer packages difficult.

Figure 3:
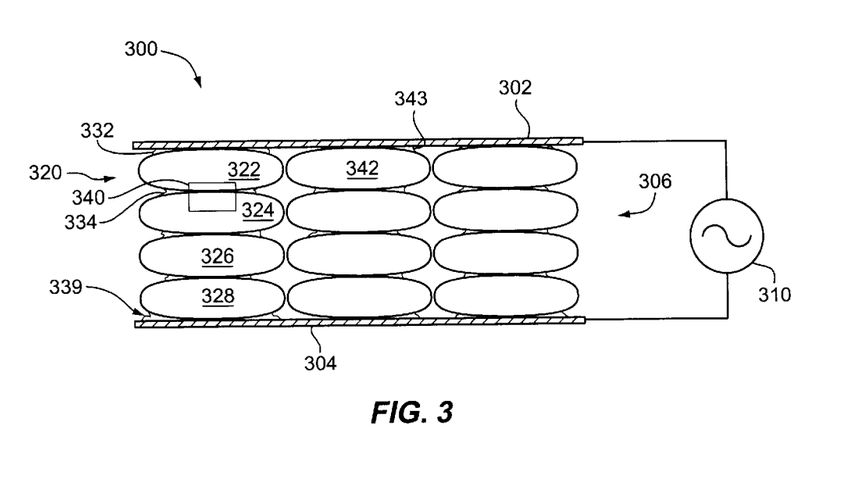
FIG. 3 depicts a system in accordance with the invention for melting and preventing ice on and between freezer packages.

A system 300 in accordance with the invention for melting ice on a freezer package is depicted in FIG. 3. System 300 includes a first electrode 302 and a second electrode 304. First electrode 302 and second electrode 304 define an interelectrode space 306 between the first and second electrodes for accommodating one or a plurality of freezer packages. System 300 further includes an AC power source 310 for providing an AC voltage across first electrode 302 and second electrode 304. Generally, the AC voltage has a frequency not less than about 1000 Hz. Preferably, the AC voltage has a frequency in a range of about from 10 kHz to 30 kHz. Typically, AC power source 310 provides AC voltage with an amplitude in a range of about from 10 volts to 100 volts. Higher voltage, for example, up to 10 kV or higher, may be desirable in large stacks of packages or in very cold temperature ranges.

FIG. 3 further depicts several stacks of a plurality of freezer packages with ice on and between the freezer packages. Freezer package stack 320 includes a first freezer package 322 proximate to first electrode 302. Freezer package 324 is located adjacent to and below freezer package 322. Similarly, freezer package 326 is located adjacent to and below freezer package 324. Last freezer package 328 is located proximate to second electrode 304 and between freezer package 326 and second electrode 304. Ice 332 is located between first freezer package 322 and first electrode 302. Ice 334 is located between freezer package 322 and freezer package 324. Ice 339 is located between last freezer package 328 and second electrode 304. First electrode 302 and first freezer package 342 define an interconductor space 343. Similarly, other freezer packages proximate to an electrode define corresponding interconductor spaces with the electrode. Ice, air or combination of ice and air typically occupy most of the volume of an interconductor space.

Figure 4:
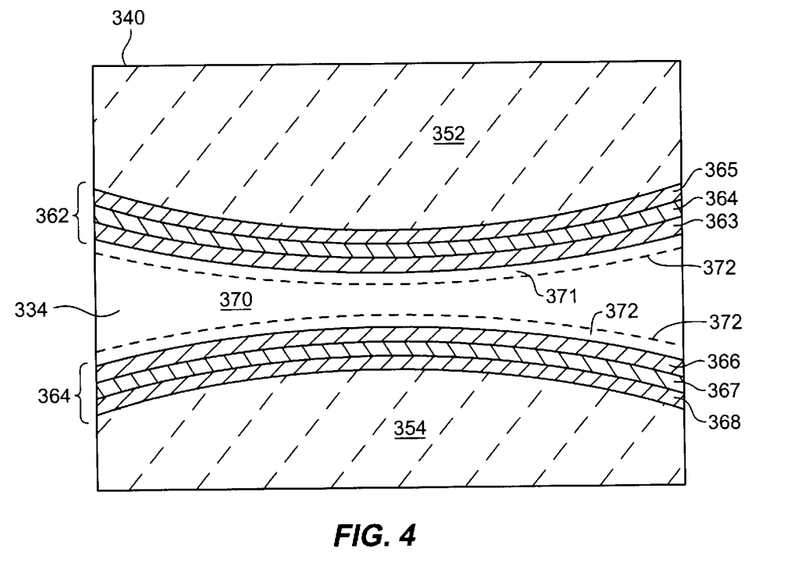
FIG. 4 shows an exploded, cross-sectional view of ice between adjacent regions of two freezer packages in a system in accordance with the invention.

FIG. 4 shows an exploded, cross-sectional view of the region 340 designated by the rectangle in FIG. 3. FIG. 4 depicts contents 352 of freezer package 322 and contents 354 of freezer package 324. In accordance with the invention, contents 352, 354 of freezer packages 322, 324, respectively, may be any material stored in a freezer; for example, food or other solid or liquid materials. Typically, contents 352, 354 are moderately or strongly dielectric, so that they do not conduct significant electric current. But, even when contents are conductive, there is no heating of the contents because there is no potential difference within the contents of a particular package. FIG. 4 further shows freezer package wall 362 of freezer package 322. Freezer package wall 362 includes a laminate structure with an outer dielectric film 363 and a continuous inner conductive layer 364. Preferably, freezer package wall 362 also includes an inner dielectric film 365. FIG. 4 also shows freezer package wall 364 of freezer package 324. Freezer package wall 364 includes outer dielectric film 366, inner conductive layer 367 and inner dielectric film 368. FIG. 4 further shows ice 334, which includes bulk ice 370 and interfacial ice layers 371, 372. Interfacial ice 371 is located at the ice-solid interface between ice 334 and freezer package wall 362 of freezer package 322. Similarly, interfacial ice 372 is located at the ice-solid interface between ice 334 and freezer package wall 364 of freezer package 324. The dashed lines 373 indicate that there is no clear boundary between bulk ice 370 and interfacial ice 371, 372. The thickness of ice that melts in accordance with the invention is typically about one micrometer. The distance between inner conductive layer 364 and inner conductive layer 367 at any location is referred to as the interconductor distance. Inner conductive layer 364 and inner conductive layer 367 also define an interconductor space, some of which is occupied by ice 334. For a given potential difference between adjacent conductive layers, the strength of the alternating electric field in the ice is inversely proportional to the interconductor distance. Therefore, it is desirable to minimize the interconductor space between freezer packages and between a first freezer package and a first electrode, or a last freezer package a second electrode.

Figure 5:
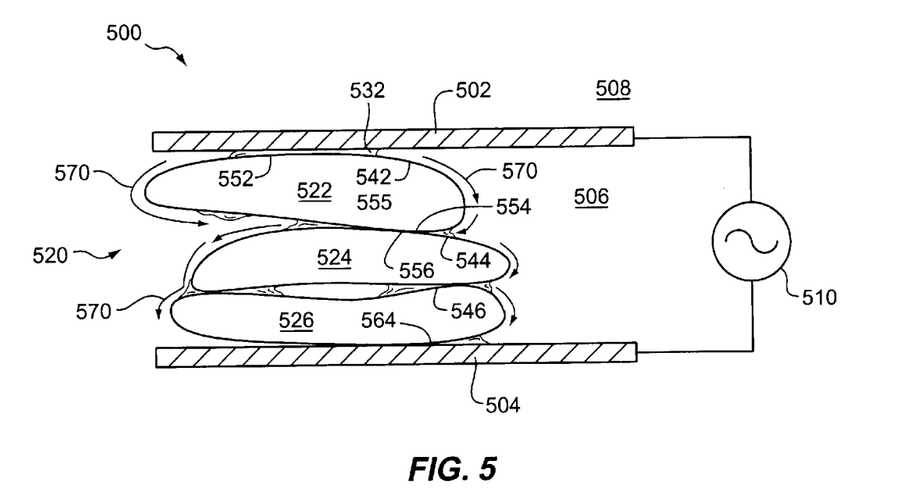
FIG. 5 depicts in schematic form a system in accordance with the invention being operated by a method in accordance with the invention.

FIG. 5 depicts in schematic form a system 500 in accordance with the invention being operated by a method in accordance with the invention. System 500 includes a first electrode 502 and a second electrode 504 that define an interelectrode space 506. One or both of electrodes 502, 504 may be integral with a freezer housing (not shown). Alternatively, one or both of electrodes 502, 504 may be mounted within freezer space 508 of a freezer housing. Alternatively, one or both of electrodes 502, 504 may be movable within the freezer space 508 of a freezer housing. System 500 further includes AC power source 510 for providing an AC voltage across first electrode 502 and second electrode 504. A stack 520 of a plurality of freezer packages is located in the interelectrode space 506. Stack 520 includes first freezer package 522 proximate to first electrode 502, freezer package 524 adjacent to freezer package 522, and freezer package 526 proximate to second electrode 504 and located between freezer package 524 and second electrode 504. Freezer package 522 has a freezer package wall 542, which includes an outer dielectric film and a continuous inner conductive layer, as discussed with reference to FIG. 4. Similarly, freezer packages 524, 526 have freezer package walls 544, 546, respectively, each of which includes an outer dielectric film and an inner conductive layer. A first wall portion 552 of freezer package wall 542 of first freezer package 522 is adjacent to and proximate to first electrode 502. Ice 532 is located on freezer package 522 at first wall portion 552 between freezer package 522 and first electrode 502. Typically, a thin layer of air may also be located between first electrode 502 and first freezer package 522. Accordingly, a portion of the inner conductive layer corresponding to first wall portion 552 is located proximate to first electrode 502. The inner conductive layer of first wall portion 552 and first electrode 502 are separated by an interconductor distance and define an interconductor space. A second wall portion 554 of first freezer package 522 is distal from first electrode 502 and is located adjacent to and proximate to freezer package 524. Accordingly, second wall portion 554 of first freezer package 522 is adjacent to and proximate to first wall portion 556 of freezer package wall 544 of freezer package 524. First wall portion 556 includes a corresponding portion of outer dielectric film and a portion of an inner conductive layer. As a result, the inner conductive layer of freezer package wall 542 at portion 554 is opposite and proximate to the inner conductive layer of freezer package wall 544 at portion 556. The two opposite portions of the inner conductive layers define an interconductor space 557 and are separated by an interconductor distance. As depicted in FIG. 5, second wall portion 554 is substantially opposite and parallel to first wall portion 552. It is understood that different relative orientations are possible in accordance with the invention between various wall portions of freezer packages and electrodes. Typically, in a method in accordance with the invention, as explained with reference to FIG. 5, an AC power source 510 provides a high-frequency AC voltage across first electrode 502 and second electrode 504. Generally, the frequency is not less than 1000 Hz. Preferably, the AC voltage has a frequency in a range of about from 10 kHz to 30 kHz. The AC voltage creates an alternating electric field in the interelectrode space 506. There is, however, essentially no electric field in the interior of the freezer packages. Each freezer package has a continuous inner conductive layer. The continuous inner conductive layer has substantially the same electric potential at all points. Therefore, there is no electric field within a freezer package, and the contents of a freezer package are likewise not subjected to an alternating electric field. For this reason, the contents of a freezer package in accordance with the invention are not heated. A potential difference does exist, however, between first electrode 502 and the inner conductive layer of freezer package wall 542 of first freezer package 522. The inner conductive layer of freezer package wall 542 is electrically insulated from first electrode 502 by the outer dielectric film of freezer package wall 542. A thin layer of air between first electrode 502 and freezer package 522 also insulates, if present. Similarly, the inner conductive wall at portion 564 of last freezer package 526 is proximate to second electrode 504, but is electrically insulated from second electrode 504 by the outer dielectric film of freezer package wall 546.

The outer dielectric film of freezer package wall 542 at portion 552 of first freezer package 522 is proximate to first electrode 502 and acts as a thin film capacitor between first electrode 502 and the inner conductive layer of freezer package wall 542. Generally, at high frequency, a capacitor has a low impedance and it does not provide strong resistance to high-frequency currents. A capacitor subjected to high-frequency voltage acts virtually as a direct electrical connection. Thus, a capacitor provides efficient indirect connection of a high-frequency voltage source to an electrical conductor. Therefore, when a high-frequency AC voltage is applied across first electrode 502 and second electrode 504 in accordance with the invention, it generates AC in the inner conductive layer of freezer package wall 542 of first freezer package 522. Similarly, the AC voltage generates a high-frequency AC in the inner conductive layer of last freezer package 526. By the same mechanism, high-frequency AC is carried from the inner conductive layer of freezer package wall 542 at portion 554 across the outer dielectric film of freezer package 522, and across the outer dielectric film of freezer package 524 to the inner conductive layer of freezer package 524. Arrow symbols 570 in FIG. 5 represent the flow of AC in the inner conductive layers and across the outer dielectric films of freezer packages 522, 524, 526 during one-half of an AC cycle. During the other half of the AC cycle, the AC flows in the opposite direction. At any given moment during operation, the total voltage difference between first electrode 502 and second electrode 504 is essentially distributed along stack 520 of the plurality of freezer packages 522, 524, 526. The electric potential of each freezer package is essentially uniform because the inner conductive layer is substantially continuous about the package and uniformly distributes potential. Since the potential of an individual freezer package is uniform, there is no alternating electric field within the freezer package or its contents. As a result, there is virtually no dielectric loss heating of the contents. Whatever insignificant heating of the contents occurs is generally less than one calorie per gram, and typically less than 0.1 calorie per gram of contents.

A potential difference occurs between first electrode 502 and first freezer package 522, between adjacent freezer packages and between last freezer package 526 and second electrode 504. In accordance with the invention, AC flows through each inner conductive layer, with a potential difference between inner conductive layers of adjacent freezer packages. The high-frequency voltage differential across each respective interconductor space generates a high-frequency alternating electric field. The semiconductive interfacial ice absorbs electrostatic energy from the high-frequency alternating electric field. This, in turn, generates high-frequency conductivity AC in the semiconductive interfacial ice. The AC flowing through the moderately resistive semiconductive interfacial ice causes Joule heating, which melts the ice. Thus, the interfacial ice converts a portion of the electrostatic energy into conductivity (resistive) AC, which generates Joule heat. Since the conductivity of interfacial ice is much higher than bulk ice, conductivity AC concentrates in the interfacial ice, heating and melting the interfacial ice. Since practically no conductivity AC flows through the bulk ice, there is insignificant heating and melting of the bulk ice.

Preferably, first electrode 502 is in direct contact with the outer dielectric film of first freezer package 522 (or with ice 532) because air located between the outer dielectric film of freezer package 522 and first electrode 502 has a strong dielectric constant. Air causes a voltage drop that is not useful for melting in accordance with the invention. Also, it is preferred that the interconductor distance between adjacent inner conductive layers or between an inner conductive layer and an electrode be minimized. Since the interconductor distance is relatively small, typically on the order of several millimeters or less, a potential difference of about from 2 to 10 volts per layer of ice (e.g., ice between two adjacent freezer packages) is generally sufficient for melting the corresponding interfacial ice.

Figure 6:
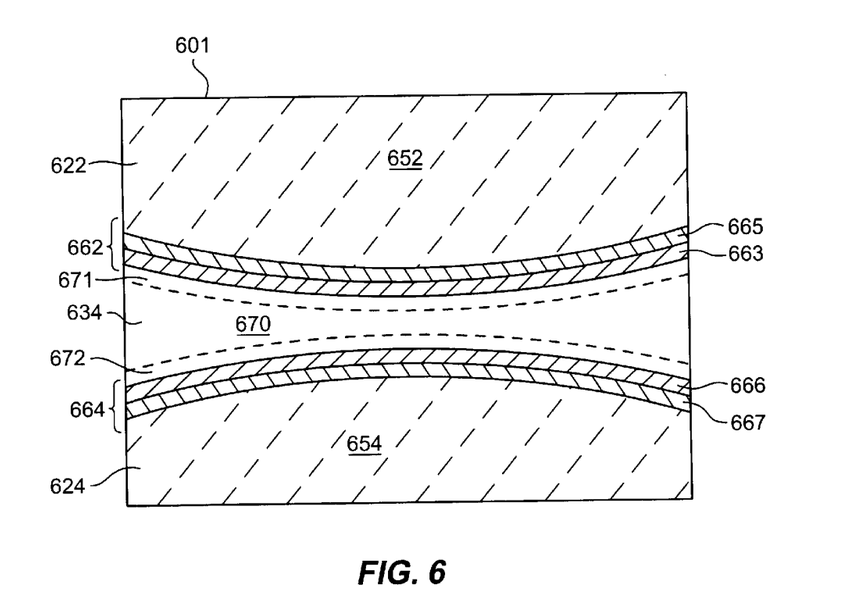
FIG. 6 depicts an exploded, cross-sectional view of ice between adjacent regions of two freezer packages in a system in accordance with the invention.

FIG. 6 depicts an exploded, cross-sectional view of a region 601 in a system in accordance with the invention in which ice 634 is located between freezer packages 622, 624. Freezer package 622 includes freezer package wall 662. Freezer package wall 662 includes a laminate structure with an outer dielectric film 663 and a substantially continuous or completely continuous inner conductive layer 665. Freezer package wall 664 of freezer package 624 is also a laminate structure including outer dielectric film 666 and inner conductive layer 667. FIG. 6 further shows ice 634, which includes bulk ice 670 and interfacial ice layers 671, 672. Interfacial ice 671 is located at the ice-solid interface between ice 634 and freezer package wall 662 of freezer package 622. Similarly, interfacial ice 672 is located at the ice-solid interface between ice 634 and freezer package wall 664 of freezer package 624. The distance between inner conductive layer 665 and inner conductive layer 667 at any location is referred to as the interconductor distance. For a given potential difference between adjacent conductive layers, the strength of the alternating electric field in the ice is inversely proportional to the interconductor distance. Therefore, it is desirable to minimize the spacing between freezer packages, between a first freezer package and a first electrode, and between a last freezer package a second electrode. As depicted in FIG. 6, contents 652 of freezer package 622 are in contact with the inner conductive layer 665. Similarly, contents 654 of freezer package 624 are in contact with inner conductive layer 667.

Figure 7:
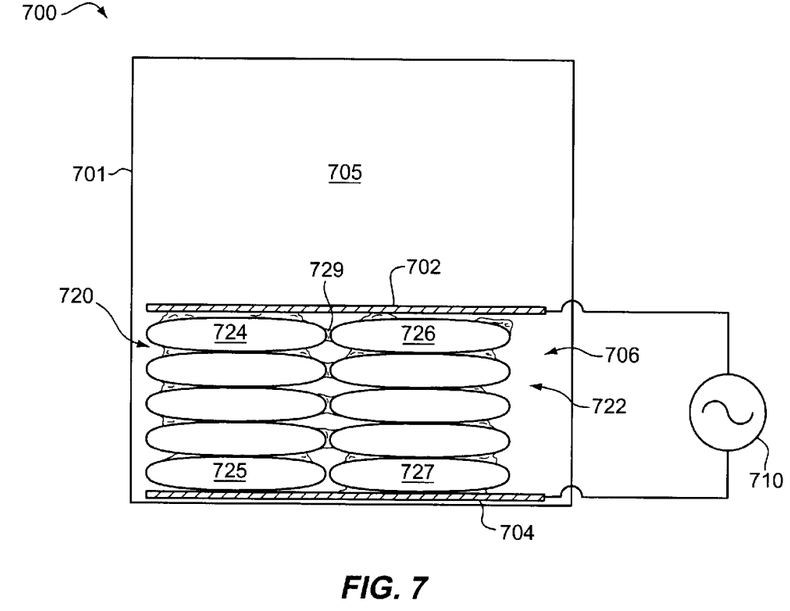
FIG. 7 depicts a freezer system in accordance with the invention that includes a movable first electrode.

FIG. 7 depicts a freezer system 700 in accordance with the invention. Freezer system 700 includes freezer housing 701, first movable electrode 702 and second electrode 704. Second electrode 704 may be integral with freezer housing 701. Alternatively, second electrode 704 may be mounted within freezer space 705 enclosed by freezer housing 701. Alternatively, second electrode 704 may be movable within freezer space 705. As depicted in FIG. 7, a first electrode 702 is movable for forming a variable interelectrode space 706 between first movable electrode 702 and second electrode 704. Freezer system 700 further includes AC power source 710 for providing an AC voltage across the first and second electrodes with a frequency not less than about 1000 Hz, preferably in a range of about from 10 kHz to 30 kHz. A stack 720 of a plurality of freezer packages and a stack 722 of a plurality of freezer packages are located in the interelectrode space 706. Stack 720 includes a first freezer package 724 proximate to first electrode 702, and a last freezer package 725 proximate to second electrode 704. Similarly, stack 722 includes a first freezer package 726 proximate to first electrode 702, and a last freezer package 727 proximate to second electrode 704. When a high-frequency AC voltage is applied across electrodes 702, 704, Joule heat is generated in the interfacial ice between freezer packages (and between a first or last freezer package and one of the electrodes), causing the interfacial ice to melt, but with insignificant heating of the bulk ice and essentially no heating of the contents of the freezer packages. As a result, freezer packages that were previously frozen stuck in stacks of freezer packages can be moved easily, without undesirable heating of freezer package contents or bulk ice. As freezer packages are removed or moved within the freezer, the size and shape of the stacks 720, 722 changes. Movable first electrode 702 can be moved to minimize the air spacing between first electrode 702 and first freezer packages 724 and 726 in stacks 720, 722, respectively. In certain embodiments, first movable electrode 702 is a flexible mat that conforms to the surfaces of freezer packages (or package) to minimize the interconductor distance between first movable electrode 702 and the inner conductive layer of the first freezer packages in each stack. A movable electrode in the form of a flexible mat typically includes conductive rubber or a nonconductive flexible material coated with conductive metal or metal oxide. To melt ice located between packages lying at approximately the same vertical level, the first electrode in the second electrode are disposed to generate a potential difference between the packages. For example, ice 729 between packages 724 and 726 in FIG. 7 is melted in accordance with the invention by mounting first electrode 702 on the left side of stack 720, and mounting second electrode 704 on the right side of stack 722.

Figure 8:
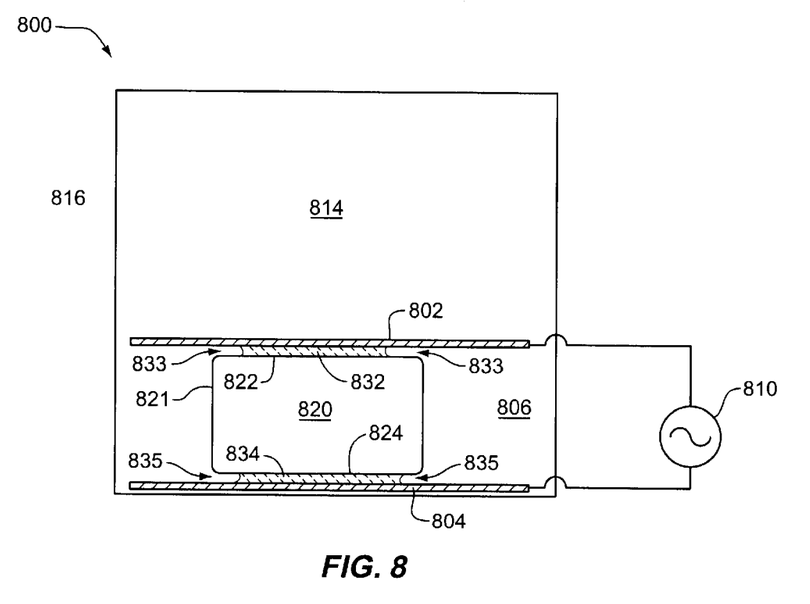
FIG. 8 depicts a system in accordance with the invention for melting and preventing ice on a freezer package.
Figure 9:
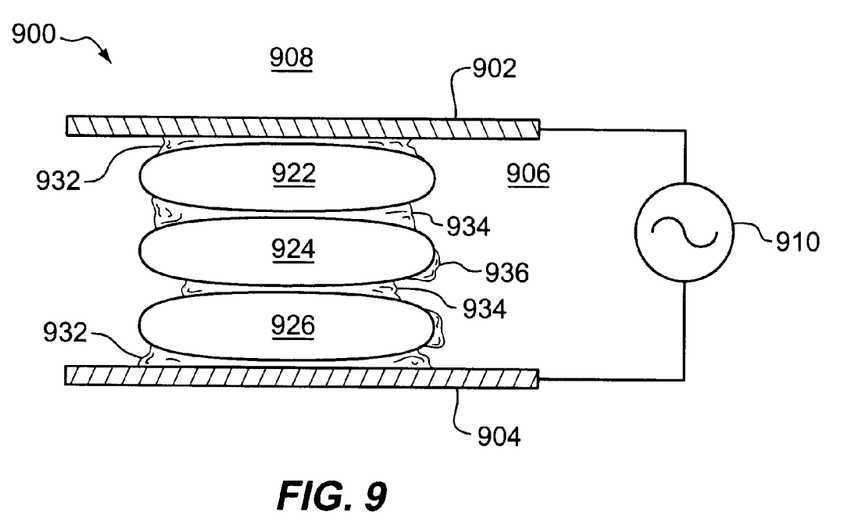
FIG. 9 depicts a system in accordance with the invention for melting and preventing ice on objects containing substantially dielectric material.

FIG. 8 depicts a freezer system 800 in accordance with the invention. Freezer system 800 includes first electrode 802 and second electrode 804, which form an interelectrode space 806. Freezer system 800 further includes AC power source 810 for providing an AC voltage across the first and second electrodes with a frequency not less than about 1000 Hz, preferably in a range of about from 10 kHz to 30 kHz. A freezer package 820 in accordance with the invention is located in the interelectrode space 806. Typically, interelectrode space 806 and freezer package 820 are located within a freezer space 814, which is enclosed by a freezer housing 816. Second electrode 804 may be integral with freezer housing 801. Alternatively, second electrode 804 may be mounted within the freezer space 816. Alternatively, second electrode 804 may be movable within freezer space 805. As depicted in FIG. 8, first electrode 802 is movable for forming a variable interelectrode space 806 between first movable electrode 802 and second electrode 804. Alternatively, first electrode 802 may be integral with freezer housing 816 or it may be temporarily or permanently fixed within freezer space 814. Freezer package 820 has a freezer package wall 821, including a wall portion 822 proximate to first electrode 802, and a wall portion 824 proximate to second electrode 804. Ice 832 is located in interconductor space 833 between first electrode 802 and freezer wall portion 832. Interfacial ice is located at ice-solid interfaces at the surface of electrode 802 and at the surface of freezer wall portion 832. Ice 834 is located in interconductor space 835 between second electrode 804 and freezer wall portion 824. Interfacial ice is located at the ice-solid interface at the surfaces of electrode 804 and at the surface of freezer wall portion 824. When a high-frequency AC voltage is applied across electrodes 802, 804, Joule heat is generated in the interfacial ice, causing the interfacial ice to melt, but with no significant heating of the bulk ice and with virtually no heating of the contents of freezer package 820. As a result, freezer package 820 can be moved easily, without undesirable heating of freezer package contents or bulk ice.

Although the embodiments have been described principally with regard to freezer packages, the structures and methods herein described are applicable to the melting and the removal of ice in general, and in particular the removal of ice from the surfaces of solid objects. Generally, a method and a system in accordance with the invention is useful to melt or prevent ice on or between one or more objects, the bulk of which is substantially dielectric. In other words, a freezer package having an outer dielectric film and a continuous inner conductive layer is not necessary for the invention. System 900 in FIG. 9 includes a first electrode 902 and a second electrode 904 that define an interelectrode space 906. One or both of electrodes 902, 904 may be integral with a freezer housing (not shown). Alternatively, one or both of electrodes 902, 904 may be mounted within freezer space 908 of a freezer housing. Alternatively, one or both of electrodes 902, 904 may be movable within the freezer space 908 of a freezer housing. System 900 further includes AC power source 910 for providing an AC voltage across first electrode 902 and second electrode 904. Typically, the AC voltage has an amplitude in a range of about from 10 to 1000 volts, but the voltage is 10 kV or higher in certain conditions. Object 922 is proximate to first electrode 902, object 924 is adjacent to object 922, and object 926 is proximate to second electrode 904 and located between object 924 and second electrode 904. Objects 922, 924, 926 may be, for example, chunks of ice, sides of meat, or any other object, the bulk of which is substantially dielectric material. Ice 932, 934, 936 on and between the objects and the electrodes comprise interfacial ice at ice-solid interfaces and at grain boundaries in ice. There is no significant heating of the dielectric bulk material of objects 922, 924, 926. The relatively high conductivity of the ice at an interface, however, causes the ice there to melt. Also, the relatively high conductivity of liquid water prevents freezing of water that condenses in interelectrode space 906 and on the surfaces of objects 922, 924, 926 and that is subject to the high-frequency alternating electric field.

Embodiments in accordance with the invention have been described with reference to FIGS. 3–9, in which electrodes and freezer contents are arranged vertically. It is understood that a first electrode and a second electrode, freezer packages and other elements described in the specification may be arranged horizontally or in other relative orientations.

A method and a system in accordance with the invention for melting and preventing ice may be used in various applications, especially in applications involving ice between freezer packages.

It is evident that those skilled in the art may now make numerous uses and modifications of the specific embodiments described, without departing from the inventive concepts. It is also evident that the steps recited may, in some instances, be performed in a different order; or equivalent structures and processes may be substituted for the structures and processes described. Since certain changes may be made in the above apparatus and methods without departing from the scope of the invention, it is intended that all subject matter contained in the above description or shown in the accompanying drawing be interpreted as illustrative and not in a limiting sense. Consequently, the invention is to be construed as embracing each and every novel feature and novel combination of features present in or inherently possessed by the systems, methods and compositions described in the claims below and by their equivalents.

What is claimed is:

1. A system for melting and preventing ice on a freezer package, comprising:

a first electrode;

a second electrode, the first electrode and the second electrode defining an interelectrode space between the first electrode and the second electrode for accommodating the freezer package; and an AC power source for providing an AC voltage across the first and second electrodes with a frequency not less than about 1000 Hz, which AC voltage does not significantly heat contents of the freezer package.

2. A system as in claim 1, wherein the AC voltage has a frequency in a range of about from 10 kHz to 30 kHz.

3. A system as in claim 1, wherein the AC voltage has an amplitude in a range of about from 10 volts to 10 kV.

4. A system as in claim 1, further comprising:

a freezer package located in the interelectrode space, the freezer package comprising a freezer package wall with an outer dielectric film and a continuous inner conductive layer contiguous to the outer dielectric film, the freezer package wall comprising a first portion proximate to the first electrode so that the AC voltage generates an alternating electric field between the first electrode and the first portion strong enough to melt ice.

5. A system as in claim 4, wherein the AC voltage heats the contents of the freezer package less than 0.1 calorie per gram of contents.

6. A system as in claim 4, wherein the AC voltage heats the contents of the freezer package less than one calorie per gram of contents.

7. A system as in claim 4, further comprising:

a plurality of freezer packages arranged in a stack, the stack comprising a first freezer package proximate to the first electrode, and a last freezer package proximate to the second electrode, each of the plurality of freezer packages comprising an outer dielectric film and a continuous inner conductive layer contiguous to the outer dielectric film.

8. A system as in claim 1, wherein a freezer package contains food.

9. A system as in claim 1, wherein a freezer package contains biological tissue.

10. A freezer system for melting and preventing ice in a freezer, comprising:

a freezer comprising a housing;

a first movable electrode;

a second electrode, the first movable electrode configured to be movable within the housing for forming an interelectrode space in the housing to accommodate a freezer package between the first movable electrode and the second electrode; and an AC power source for providing an AC voltage across the first and second electrodes with a frequency not less than about 1000 Hz, which AC voltage does not significantly heat contents of a freezer package.

11. A system as in claim 10, wherein the AC voltage has a frequency in a range of about from 10 kHz to 30 kHz.

12. A system as in claim 10, wherein the AC voltage has an amplitude in a range of about from 10 volts to 10 kV.

13. A system as in claim 10, wherein the second electrode is integral with the freezer housing.

14. A system as in claim 10, wherein the second electrode is a movable electrode.

15. A system as in claim 10, further comprising:

a freezer package located in the interelectrode space, the freezer package comprising a freezer package wall an outer dielectric film and a continuous inner conductive layer contiguous to the outer dielectric film, the freezer package wall comprising a first portion proximate to the first electrode so that the AC voltage generates an alternating electric field between the first electrode and the first portion strong enough to melt ice.

16. A system as in claim 10, further comprising:

a plurality of freezer packages arranged in a stack comprising a first freezer package proximate to the first electrode, and a last freezer package proximate to the second electrode, each of the plurality of freezer packages comprising an outer dielectric film and a continuous inner conductive layer contiguous to the outer dielectric film.

17. A system for melting and preventing ice, comprising:

a first electrode;

a second electrode, the first electrode and the second electrode defining an interelectrode space between the first electrode and the second electrode;

an AC power source for providing an AC voltage across the first and second electrodes with a frequency not less than about 1000 Hz.

18. A system as in claim 17, further comprising a conductive layer located in the interelectrode space, the conductive layer being electrically insulated from the first and second electrodes.

19. A system as in claim 17, further comprising an outer dielectric film that electrically insulates the conductive layer from the first and second electrodes and from ice.

20. A system as in claim 17, wherein the AC voltage has a frequency in a range of about from 10 kHz to 30 kHz.

21. A system as in claim 17, wherein the AC voltage has an amplitude in a range of about from 10 volts to 10 kV.

22. A system as in claim 17, wherein the AC voltage does not significantly heat contents of a freezer package located in the interelectrode space.

23. A system as in claim 17, wherein the AC voltage does not significantly heat bulk dielectric material or bulk ice located in the interelectrode space.

24. A method for melting and preventing ice on a freezer package, comprising:

generating a high-frequency alternating electric field without significantly heating contents of the freezer package located in the alternating electric field.

25. A method as in claim 24, wherein generating a high-frequency alternating electric field comprises applying an AC voltage with a frequency not less than about 1000 Hz across a first electrode and a second electrode, the freezer package being located in an interelectrode space between the first electrode and the second electrode.

26. A method as in claim 22, wherein generating the high-frequency alternating electric field comprises generating conductivity AC in an inner conductive layer of a plurality of freezer packages arranged in a stack, a first freezer package of the stack located proximate to the first electrode, and a last freezer package of the stack located proximate to the second electrode.

27. A method for melting and preventing ice, comprising:

generating a high-frequency alternating electric field without significantly heating bulk dielectric material subject to the alternating electric field.

28. A method as in claim 27, wherein generating the high-frequency alternating electric field in the ice comprises applying an AC voltage with a frequency not less than about 1000 Hz across a first electrode and a second electrode.

* * * * *